(12) United States Patent
Todd et al.

(10) Patent No.: US 12,372,056 B2
(45) Date of Patent: Jul. 29, 2025

(54) MALE SPAR BEAM FOR A SEGMENTED WIND TURBINE BLADE

(71) Applicant: BLADE DYNAMICS LIMITED, Eastleigh (GB)

(72) Inventors: Paul Damian Michael Todd, Eastleigh (GB); Mark Hancock, Eastleigh (GB)

(73) Assignee: BLADE DYNAMICS LIMITED, Eastleigh (GB)

( * ) Notice: Subject to any disclaimer, the term of this patent is extended or adjusted under 35 U.S.C. 154(b) by 0 days.

(21) Appl. No.: 18/023,187

(22) PCT Filed: Sep. 22, 2021

(86) PCT No.: PCT/EP2021/076065
§ 371 (c)(1),
(2) Date: Feb. 24, 2023

(87) PCT Pub. No.: WO2022/063830
PCT Pub. Date: Mar. 31, 2022

(65) Prior Publication Data
US 2023/0400008 A1    Dec. 14, 2023

(30) Foreign Application Priority Data
Sep. 25, 2020   (GB) ..................... 2015168

(51) Int. Cl.
*F03D 1/06*    (2006.01)
*B29C 70/02*   (2006.01)
(Continued)

(52) U.S. Cl.
CPC ......... *F03D 1/0681* (2023.08); *B29C 70/023* (2013.01); *B29C 70/48* (2013.01);
(Continued)

(58) Field of Classification Search
CPC ..... F03D 1/0677; F03D 1/0681; F03D 1/0675
See application file for complete search history.

(56) References Cited

U.S. PATENT DOCUMENTS

| 3,967,996 A | 7/1976 | Kamov et al. |
| 10,487,797 B2 * | 11/2019 | Hancock ............... B29C 70/865 |

FOREIGN PATENT DOCUMENTS

WS    2020122870 A1    6/2020

* cited by examiner

*Primary Examiner* — Michael L Sehn
(74) *Attorney, Agent, or Firm* — Nath, Goldberg & Meyer; Jerald L. Meyer; Tanya E. Harkins

(57) ABSTRACT

A male spar beam for mutually attaching a segmented wind turbine blade and, comprising: a leading-edge part comprising a second upper wall, a second lower wall, and a second shear wall connecting the second upper wall with the second lower wall, the leading-edge part; and a trailing-edge part comprising a first upper wall, a first lower wall, and a first shear wall connecting the first upper wall with the first lower wall. The leading-edge and trailing-edge parts being separately formed integrally in one piece, respectively. An end of the first lower wall is attached to an end of the second lower wall so that the first lower wall and the second lower wall form a lower spar cap of the male spar beam, and an end of the first upper wall is attached to an end of the second upper wall so that the first upper wall and the second upper wall form an upper spar cap of the male spar beam.

16 Claims, 11 Drawing Sheets

(51) Int. Cl.
*B29C 70/48* (2006.01)
*B29D 99/00* (2010.01)
*B32B 5/02* (2006.01)
*B32B 5/26* (2006.01)
B29K 105/08 (2006.01)
B29K 307/04 (2006.01)
B29K 309/08 (2006.01)
B29L 31/08 (2006.01)

(52) U.S. Cl.
CPC ............ *B29D 99/0028* (2013.01); *B32B 5/02* (2013.01); *B32B 5/26* (2013.01); *F03D 1/0677* (2023.08); B29K 2105/0872 (2013.01); B29K 2307/04 (2013.01); B29K 2309/08 (2013.01); B29L 2031/085 (2013.01); B32B 2250/20 (2013.01); B32B 2260/023 (2013.01); B32B 2260/046 (2013.01); B32B 2603/00 (2013.01); F05B 2230/60 (2013.01); F05B 2280/6003 (2013.01)

MALE SPAR BEAM FOR A SEGMENTED WIND TURBINE BLADE

This is a National Phase Application filed under 35 U.S.C. 371 as a national stage of PCT/EP2021/076065, filed Sep. 22, 2021, an application claiming the benefit of British Application No. 2015168.4, filed Sep. 25, 2020, the content of each of which is hereby incorporated by reference in its entirety.

TECHNICAL FIELD

The present disclosure relates generally to a method of manufacturing of a hollow composite structure, and more particularly to a method for manufacturing a male spar beam for use in a wind turbine rotor blade.

BACKGROUND

Wind power provides a clean and environmentally friendly source of energy. Wind turbines usually comprise a tower, generator, gearbox, nacelle, and one or more rotor blades. The wind turbine blades capture kinetic energy of wind using known airfoil principles. Modern wind turbines may have rotor blades that exceed 90 meters in length.

Wind turbine blades are usually manufactured by forming two shell parts or shell halves from layers of woven fabric or fibre and resin. Spar caps or main laminates are placed or integrated in the shell halves and may be combined with shear webs or spar beams to form structural support members. Spar caps or main laminates may be joined to, or integrated within, the inside of the suction and pressure halves of the shell.

As the size of wind turbines increases, the manufacturing and transporting of wind turbine blades become more challenging and costly. To address this, the industry is developing segmented wind turbine rotor blades (these may also be known as sectional or pin-joined wind turbine blades) wherein two or more separate blade segments are manufactured and then transported disassembled to a site for assembly into a complete blade. This may result in an easier manufacturing process and may reduce the cost of transportation and erection of wind turbines.

Typically, the blade segments are joined by a male spar beam that extends span-wise from one blade segment into a female receiving section of the other blade segment. The male spar beam is often attached to the female receiving section via a pin joint. Such a male spar beam comprises two spar caps distanced by one or more shear webs and may often be a box-type male spar beam, i.e. with two shear webs connecting corresponding edges of the spar caps to form a box-like cross-sectional shape.

Conventionally, the male spar beam is manufactured in a two-part mould comprising a lower mould part, an upper mould part, and a mandrel. Fibre material is laid up in a lower mould upon which the mandrel is positioned. Additional fibre material is placed on the mandrel and the upper mould part then arranged to close off the lower mould part. The fibre material is then infused and cured typically via a conventional vacuum assisted resin infusion process to form a male spar beam. The male spar beam is then removed from the mould and the mandrel is taken out from the male spar beam, thereby forming a hollow interior space of the male spar beam. An example of such a process is disclosed in WO 2020/122862.

The mandrel may be made of a rigid or solid material which has the advantage of being relatively dimensionally stable but may be difficult to remove after infusion. Another option is to have an inflatable mandrel which can be collapsed after infusion. An example of such a mandrel is disclosed in U.S. Pat. No. 8,919,754. However, such an inflatable mandrel may deform during the moulding process.

A disadvantage of this process of manufacturing a male spar beam is that a relatively large amount of uncured fibre material has to be precisely arranged relative to each other in the lower mould part, around and on the mandrel until the mould can be closed off by the upper mould part. In this process, there is a risk that lay-up of fibre material unintentionally causes some of the previously laid-up fibre material to move, thereby increasing the risk of a defect in the male spar beam. Such a defect is typically only discoverable after infusion and curing, resulting in the entire spar beam to be discarded.

Another disadvantage is that the interior surfaces of the male spar beam is difficult to access after moulding. Typically, a flow media layer is required between the fibre material and the mandrel to ensure sufficient wetting of the interior fibre sheets during infusion. Such a flow media layer must be removed after withdrawal of the mandrel which can be a labour-intensive task.

SUMMARY

On this background, it may be seen as an object of the present disclosure to provide a male spar beam for a segmented wind turbine blade, and a method of manufacturing such a male spar beam which at least mitigates some of the above disadvantages.

One or more of these objects may be met by aspects of the present disclosure as described in the following.

A first aspect of this disclosure relates to a male spar beam for engaging with a female receiving section of a first blade segment of a segmented wind turbine blade and for attachment to a second blade segment of the segmented wind turbine blade and, the segmented wind turbine blade having a profiled contour including a pressure side and a suction side, and a leading edge and a trailing edge with a chordwise direction extending therebetween, the segmented wind turbine blade extending in a longitudinal direction from a root end to a tip end thereof, wherein the male spar beam extends in a longitudinal direction extending from a first end to a second end thereof, the second end being configured for engaging with the female receiving section of the segmented wind turbine blade, and wherein the male spar beam comprises:

an upper spar cap extending in the longitudinal direction, having a width bounded by a left upper boundary and a right upper boundary, and having an upper joint arranged between the left upper boundary and the right upper boundary, and being configured for facing one of the pressure side and the suction side of the segmented wind turbine blade;

a lower spar cap extending in the longitudinal direction, and having a width bounded by a left lower boundary and a right lower boundary, having a lower joint arranged between the left lower boundary and the right lower boundary, and being configured for facing the other one of the pressure side and the suction side of the segmented wind turbine blade, the lower spar cap being positioned opposite of and extending in parallel to the upper spar cap;

a leading-edge part comprising a first upper wall, a first lower wall, and a first shear wall connecting the first upper wall with the first lower wall, the leading-edge part being formed integrally in one piece and preferably comprising a fibre-reinforced laminate material, such as a carbon or glass fibre-reinforced laminate material; and a trailing-edge part comprising a second upper wall, a second lower wall, and a second shear wall connecting the second upper wall with the second lower wall, the trailing-edge part being formed integrally in one piece separately from the leading-edge part and preferably comprising a fibre-reinforced laminate material, such as a carbon or glass fibre-reinforced laminate material;

wherein an end of the first lower wall of the leading-edge part is attached, preferably adhesively, to an end of the second lower wall of the trailing-edge part to form the lower joint so that the first lower wall and the second lower wall form the lower spar cap of the male spar beam, and wherein an end of the first upper wall of the leading-edge part is attached, preferably adhesively, to an end of the second upper wall of the trailing-edge part to form the upper joint so that the first upper wall and the second upper wall form the upper spar cap of the male spar beam.

The inventors have found that in the highest loading direction, i.e. during flapwise loading of the segmented wind turbine blade, the shear stresses are increasingly reduced towards the centre of the spar caps, see more details in the description of FIG. 10b, and have surprisingly been found to be negligible in the centre of the spar caps. There has been a prejudice in the field against providing spar caps in separate pieces subsequently joined together as it was thought to compromise the load-carrying capability thereof. However, by arranging the joints of the male spar beam towards the centre of the spar caps, the joints experience significantly reduced shear stresses compared to joints of prior art spar beams which are typically joined at the corners of the spar caps or at the shear walls.

Additionally, the leading-edge and trailing-edge parts may each be easily moulded in single-sided open moulds using a normal vacuum assisted infusion process without using a mandrel. This may reduce manufacturing defects, costs and complexity compared to using a closed mould with a mandrel.

Further, by separately manufacturing the leading-edge part and the trailing-edge part of the male spar beam, both the interior and exterior faces of the parts can easily be inspected for quality defects.

Furthermore, this design allows an increasingly versatile internal architecture as the need for a mandrel is eliminated. This allows for instance additional internal webs or additional internal components, such as a lightning protection component, e.g. a down conductor, to be easily installed prior to completing assembly of the male spar beam.

In the context of the present disclosure, a spar cap may be defined as the main load-carrying structure of a spar beam, e.g. a male spar beam, and is typically a laminate construction of high flexural strength relative to other structures of the spar beam such as shear webs and in particular relative to other structures of the segmented wind turbine blade. For instance, if both the spar caps and shear webs are made of carbon fibres, the spar caps are typically thicker. In most cases, the shear webs are essentially made of glass fibres while the spar caps are essentially made of carbon fibres. The spar cap may be tailored to resist bending moments of the spar beam, while shear wall or webs may be tailored to resist shear stresses of the spar beam.

Additionally or alternatively, the male spar beam may extend in three mutually perpendicular directions: a longitudinal direction extending from a first end to a second end thereof, a lateral direction and a thickness direction. The longitudinal direction may be parallel to the longitudinal direction of the segmented wind turbine blade. The lateral direction may be parallel to the chordwise direction of the segmented wind turbine blade. The thickness direction may be parallel to a thickness direction of the segmented wind turbine blade extending between the suction side and the pressure side of the segmented wind turbine blade.

In the context of the present disclosure, a boundary of a spar cap may be defined as an edge at the furthest chordwise distance from a central longitudinal axis of the spar cap. In most cases, the spar cap is essentially elongated plate-shaped and thus has a relatively long length, a shorter width, and an even smaller thickness. In such a case the width is measured between the boundaries. In most cases, a spar beam comprises a mixture of glass fibres and carbon fibres, wherein the carbon fibres form the spar caps and are mainly arranged at a position intended to be adjacent to the suction and pressure sides of the blade while the glass fibres form the shear webs and are arranged at a position intended to be adjacent to the leading and trailing edge of the blade. In some cases, the spar caps are encapsulated in a relatively thin glass fibre layer.

Additionally or alternatively, the male spar beam may be a box spar beam or be box shaped in a cross-section perpendicular to the longitudinal direction.

Additionally or alternatively, the male spar beam may be tapering along the longitudinal direction so that a width of the male spar beam at the first end may be greater than a width of the male spar beam at the second end.

Additionally or alternatively, the trailing-edge part and/or the leading-edge part may be C-shaped or [-shaped, preferably in a cross-section perpendicular to the longitudinal direction.

Additionally or alternatively, the male spar beam may comprise a lightning protection component, such as a down conductor. The lightning protection component may be attached to an interior surface of the male spar beam. The lightning protection component may be attached to the interior surface prior to assembling the trailing-edge part with the leading-edge part.

Additionally or alternatively, the upper joint and/or the lower joint may be positioned at a position in the range of 5%-95% of the width of the upper spar cap and/or the lower spar cap, respectively, preferably in the range of 10%-90%, more preferably in the range of 20%-80%, even more preferably in the range of 30%-70%, or most preferably in the range of 40%-60% of the width of the upper spar cap and/or the lower spar cap.

It has been discovered that in the main flapwise loading scenario, the shear stress is minimised towards the chordwise centre of each spar cap. Therefore, by positioning the joint(s) in these ranges the shear stress experienced by the joint is reduced.

Additionally or alternatively, the upper joint and/or the lower joint may be a butt joint or a scarf joint.

Additionally or alternatively, the male spar beam may further comprise an upper interior strip and/or a lower interior strip. The interior strip(s) may preferably be manufactured separately from the leading-edge part and the trailing-edge part. The upper interior strip may be attached, preferably by an adhesive, to and overlap an interior surface of the first upper wall of the leading-edge part and an interior surface of the second upper wall of the trailing-edge part, and the lower interior strip may be attached, preferably by an adhesive, to and overlap an interior surface of the first lower wall of the leading-edge part and an interior surface of the second lower wall of the trailing-edge part.

This may increase the strength of the respective joint(s).

Additionally or alternatively, the male spar beam may further comprise a first shear web part having a third shear wall attaching, preferably adhesively, the upper interior strip to the lower interior strip. The first shear web part may be manufactured separately from the leading-edge part and the trailing-edge part, and the third shear wall may preferably be formed integrally in one piece with the upper interior strip and the lower interior strip.

This may provide additional shear strength for the joint(s) to absorb stresses arising from other loading modes. The shear web part may further increase the buckling strength of the spar caps Additionally or alternatively, the first shear web part may comprise a fourth shear wall arranged adjacent to the third shear wall. The fourth shear wall may attach, preferably adhesively, the upper interior strip to the lower interior strip. The fourth shear wall may be formed integrally with the third shear wall and the upper interior strip and the lower interior strip.

Additionally or alternatively, the male spar beam may further comprise one or more additional shear web parts each having a shear wall and each attaching, preferably adhesively, the upper spar cap to the lower spar cap. Such additional shear web parts provide additional buckling strength to the spar caps and transmit shear stresses between the spar caps.

Additionally or alternatively, the third shear wall may comprise one or more fibre-reinforced elements, such as pultrusions. Additionally, the shear wall(s) of each shear web part may comprise unidirectional fibre-reinforced elements, such as pultrusions. This increases the edge strength of the shear web part(s). The fibre-reinforced elements may preferably be pre-cured. The fibre-reinforced elements may preferably comprise or consist essentially of unidirectional fibres. The fibre-reinforced elements may be manufactured by one or more processes selected from the group consisting of pultrusion process, belt-press process, CNC tape-laying process, and hand layup process. Alternative methods of manufacturing such elongated fibre-reinforcement elements may also be used.

Additionally or alternatively, the third shear wall of the first shear web part may attach, preferably adhesively, a first edge of the upper interior strip and a first edge of the lower interior strip so that the shear web part is U-shaped in a cross-section perpendicular to the longitudinal direction of the male spar beam. Such a shear web part may be particularly easy to manufacture as a simple male or female mould can be used with a conventional vacuum assisted resin infusion process.

Additionally or alternatively, the first shear web part may be formed integrally in one piece. Additionally, each shear web part may be formed integrally in one piece. This may increase the strength of the shear web part(s).

Additionally or alternatively, the male spar beam may further comprise an upper exterior strip and/or a lower exterior strip. The exterior strips may preferably be manufactured separately from the leading-edge part and the trailing-edge part. The upper exterior strip may be attached, preferably adhesively, to and be overlapping an exterior face of the first upper wall of the leading-edge part and an exterior face of the second upper wall of the trailing-edge part. The lower exterior strip may be attached, preferably adhesively, to and be overlapping an exterior face of the first lower wall of the leading-edge part and an exterior face of the second lower wall of the trailing-edge part.

This may increase the strength of the respective joint(s) and may protect the joint(s) during handling of the main spar beam.

Additionally or alternatively, the exterior strip and/or the interior strip may be overlaminated onto the exterior face(s).

Additionally or alternatively, the male spar beam may further comprise an engagement member, such as a bolt or pin, protruding from the second end of the male spar beam. The engagement member may be configured for being inserted into and engaging with the female receiving section of the segmented wind turbine blade.

Additionally or alternatively, the first shear wall of the leading-edge part may comprise an at least partially, preferably fully, embedded first reinforcement structure, such as a ring or bearing ring, including a first receiving portion, such as a hole or cut-out. The second shear wall of the trailing-edge part may preferably comprise an at least partially, preferably fully, embedded second reinforcement structure, such as a ring or bearing ring, including a second receiving portion, such as a hole or cut-out, preferably being aligned with the first receiving portion. The first reinforcement structure and/or the second reinforcement structure may comprise or consist essentially of a metal. The first receiving portion and/or the second receiving portion may form part of a locking arrangement of the segmented wind turbine blade and may be configured for receiving an engagement element of the locking arrangement, such as a pin, thereby mutually locking the segmented wind turbine blade.

This may be an easy and accurate way to incorporate such reinforcement structure(s) in the shear wall(s) of the male spar beam as the shear walls can be moulded on a horizontal surface. Further, this obviates the need for subsequently accommodating reinforcement structures in the male spar beam e.g. by precision boring or other machining processes.

A second aspect of this disclosure relates to a segmented wind turbine blade having a profiled contour including a pressure side and a suction side, and a leading edge and a trailing edge with a chord extending therebetween, the segmented wind turbine blade extending in a longitudinal direction between a root end and a tip end, the segmented wind turbine blade comprising a first blade segment having a female receiving section, and a second blade segment having a male spar beam according to the first aspect of this disclosure configured for insertion into and engaging with the female receiving section of the first blade segment.

Additionally or alternatively, the female receiving section may define an inner cavity and may have a longitudinal inner end and an opposite longitudinal open end at an end face of the first blade segment. The second blade segment may be connected to the first blade segment at a chord-wise joint. The male spar beam may be protruding at the chord-wise joint from an end face of the second blade segment and may extend through the longitudinal open end of and into the cavity of the female receiving section to be received therein and may thereby attach the first blade segment to the second blade segment. The segmented wind turbine blade may additionally comprise locking arrangement mutually locking the female receiving section and the male spar beam and thereby the first and second blade segment.

A third aspect of this disclosure relates to a method of manufacturing a male spar beam for a wind turbine blade, comprising the steps of:

providing a pre-cured trailing-edge part comprising a first upper wall, a first lower wall, and a first shear wall connecting the first upper wall with the first lower wall;

providing a pre-cured leading-edge part comprising a second shear wall, a second upper wall and a second lower wall, wherein the cured leading-edge part is provided separately from the cured trailing-edge part; and forming the male spar beam by attaching, preferably adhesively, the first upper wall of the leading-edge part to the second upper wall of the trailing-edge part via an upper joint to form an upper spar cap of the male spar beam, and attaching, preferably adhesively, the first lower wall of the leading-edge part to the second lower wall of the trailing-edge part via a lower joint to form a lower spar cap of the male spar beam.

By separately manufacturing the leading-edge part and the trailing-edge part of the male spar beam, both interior and exterior faces of the parts can easily be inspected for quality defects which can thus be remedied prior to completing the assembly of the male spar beam.

Such a method eliminates the need for a mandrel. Furthermore, the interior space of the male spar beam is easily accessible between the manufacturing steps providing an increasingly versatile internal architecture. This allows for instance additional internal webs or additional internal components, such as a lightning protection component, e.g. a down conductor, to be easily installed prior to completing assembly of the male spar beam.

Additionally or alternatively, the step of providing the pre-cured trailing-edge part may comprise a sub-method of manufacturing the leading-edge part including the steps of:

providing a first fibre material, such as glass or carbon fibres, and preferably one or more first elongated fibre-reinforced elements, preferably being pre-cured, such as pultrusions, and a first female mould with a first mould surface having a first left wall face, a first floor face, and a first right wall face arranged opposite of the first left wall face, the first wall faces extending upwards from the first floor face;

arranging the first fibre material and preferably the one or more first elongated fibre-reinforced elements on the first mould surface of the first mould;

preferably infusing the first fibre material, and preferably co-infusing the one or more first elongated fibre-reinforced elements, with a first resin material, such as an epoxy or a polyester, preferably by a vacuum assisted resin infusion process; and curing the first fibre material, and preferably the one or more first elongated fibre-reinforced elements, to provide the pre-cured leading-edge part in one piece;

and/or the step of providing a pre-cured trailing-edge part may comprise a sub-method of manufacturing the trailing-edge part including the steps of:

providing a second fibre material, such as glass or carbon fibres, and preferably one or more second elongated fibre-reinforced elements, preferably being pre-cured, such as second pultrusions, and a second female mould with a second mould surface having a second left wall face, a second floor face, and a second right wall face arranged opposite of the second left wall face, the second wall faces extending upwards from the second floor face;

arranging the second fibre material and preferably the one or more second elongated fibre-reinforced elements on the second mould surface of the second mould;

preferably infusing the second fibre material, and preferably co-infusing the one or more second elongated fibre-reinforced elements, with a second resin material, such as an epoxy or a polyester, preferably by a vacuum assisted resin infusion process; and curing the second fibre material, and preferably the one or more second elongated fibre-reinforced elements, to provide the pre-cured trailing-edge part in one piece;

wherein the first fibre material, the one or more first elongated fibre-reinforced elements, and the first mould may be different from the second fibre material, the one or more second elongated fibre-reinforced elements, and the second mould, respectively.

This has the advantage that the leading-edge and trailing-edge parts may each be easily moulded in single-sided open moulds using a normal vacuum assisted resin transfer infusion process without the need of a mandrel. This may reduce manufacturing defects, costs and complexity compared to using a closed mould with a mandrel.

Alternatively to the infusion step, the first fibre material and/or the second fibre material may be provided as pre-impregnated. The fibre material(s) may in this case be cured in an oven or autoclave.

Additionally or alternatively, the first and/or second mould is/are arranged so that the wall faces of the respective mould extend upwards against the direction of gravity from the corresponding floor face. A first pre-cured subset of the first elongated fibre-reinforced elements may be suspended, e.g. from a top of the first mould, to rest towards the first left wall surface of the first mould preferably by gravity. A second pre-cured subset of the first elongated fibre-reinforced elements may be suspended, e.g. from the top of the first mould, to rest towards the first right wall surface of the first mould preferably by gravity. A first pre-cured subset of the second elongated fibre-reinforced elements may be suspended, e.g. from a top of the second mould, to rest towards the second left wall surface of the second mould preferably by gravity. A second pre-cured subset of the second elongated fibre-reinforced elements may be suspended, e.g. from the top of the second mould, to rest towards the second right wall surface of the second mould preferably by gravity. This may be an efficient way of placing the elongated fibre-reinforced elements in the respective mould.

Additionally or alternatively, the one or more first elongated fibre-reinforced elements may be provided as forming part of a first reinforcement arrangement further comprising a plurality of first threads retaining the one or more first elongated fibre-reinforced elements in a suspended parallel orientation. The first plurality of threads may form part of the first fibre material. A first end of each thread of the plurality of first threads may extend a distance from the one or more first elongated fibre-reinforced elements so as to allow suspension of the first elongated fibre-reinforced elements. Alternatively, the first elongated fibre-reinforced elements may be provided partially enclosed in the first fibre material, e.g. in corresponding pockets of the first fibre material. The second elongated fibre-reinforced elements may be provided partially enclosed in the second fibre material, e.g. in corresponding pockets of the second fibre material. This may allow placement of the elongated fibre-reinforced elements simultaneously with the fibre material.

Additionally, the first mould surface may comprise a first left flange face adjacent to the first left wall face and/or a first right flange face adjacent to the first right wall face. The step of arranging the first fibre material and the one or more first elongated fibre-reinforced elements in the first female mould may comprise the steps of:

laying one or more fibre sheets, e.g. glass fibre sheets, of the first fibre material up against the first left wall face of the first female mould;

attaching the first ends of the plurality of first threads to the first left flange face of the first female mould to hang the one or more first elongated fibre-reinforced elements along the one or more fibre sheets laid against the first left wall face of the first female mould; and laying one or more fibre sheets, e.g. glass fibre sheets, of the first fibre material up against the one or more first elongated fibre-reinforced elements to sandwich the one or more first elongated fibre-reinforced elements between the fibre sheets;

A second reinforcement arrangement may be provided in the same way as the first reinforcement arrangement and the first ends of the threads of the second reinforcement arrangement may be attached to the same first flange face of the first mould. A third reinforcement arrangement may be provided in the same way as the first reinforcement arrangement and/or the second reinforcement arrangement. The first ends of the threads of the third reinforcement arrangement may be attached to a second flange face of the first mould. The step of curing the first fibre material and the one or more first elongated fibre-reinforced elements may thereby result in the one or more first elongated fibre-reinforced elements being at least partially embedded in the leading-edge part.

The elongated fibre-reinforced elements may be co-cured with the first fibre material and may be at least partially, preferably fully, embedded in the leading-edge part.

Additionally, the above steps may be repeated for the trailing-edge part to incorporate other reinforcement arrangement(s) in the same way as for the leading-edge part.

Additionally or alternatively, the step of providing the pre-cured leading-edge part may comprise arranging a first reinforcement structure, such as one or more first disks or rings, in the first fibre material on the first lower face of the first mould and wherein the step of infusing the first fibre material comprises co-infusing the first reinforcement structure. The step of providing the pre-cured trailing-edge part may comprise arranging a second reinforcement structure, such as one or more second disks or rings, in the second fibre material on the second lower face of the second mould. The step of infusing the second fibre material may comprise co-infusing the second reinforcement structure. The method may preferably further comprise a step of providing a first receiving portion, such as a hole or a cut-out, in the first reinforcement structure and/or a step of providing a second receiving portion, such as a hole or a cut-out, in the second reinforcement structure. The second receiving portion may preferably be aligned with the first receiving portion. The first receiving section and/or the second receiving section may form part of a locking arrangement of the segmented wind turbine blade and may be configured for receiving an engagement element of the locking arrangement, such as a pin, thereby mutually locking the segmented wind turbine blade.

Additionally or alternatively, the method may comprise a step of:

providing an upper exterior strip and/or a lower exterior strip, the exterior strips preferably being manufactured separately from the leading-edge part and the trailing-edge part, the first exterior strip and/or the second exterior strip preferably comprising a fibre laminate, optionally being either cured or uncured, and the method may further comprise a step of:

overlapping and attaching, preferably adhesively, the first exterior strip to an exterior face of the first upper wall of the leading-edge part and an exterior face of the second upper wall of the trailing-edge part, and/or overlapping and attaching, preferably adhesively, the second exterior strip to an exterior face of the first lower wall of the leading-edge part and an exterior face of the second lower wall of the trailing-edge part.

The exterior strip(s) may protect the joint(s) during further handling of the male spar beam, such as incorporation of the male spar beam into a segmented wind turbine blade, and may further increase the shear strength of the joint(s) to resist secondary loading modes of the segmented wind turbine blade, such as edge-wise bending.

Additionally or alternatively, the method may further comprise the steps of:

providing an upper interior strip and/or a lower interior strip, the interior strip(s) preferably being manufactured separately from the leading-edge part and the trailing-edge part, the exterior strip(s) preferably comprise(s) a cured or uncured fibre laminate, and overlapping and attaching, preferably adhesively, the upper interior strip to an interior surface of the first upper wall of the leading-edge part and an interior surface of the second upper wall of the trailing-edge part, and/or overlapping and attaching, preferably adhesively, the lower interior strip to an interior surface of the first lower wall of the leading-edge part and an interior surface of the second lower wall of the trailing-edge part.

Additionally or alternatively, the step of providing the upper interior strip and the lower interior strip may further comprise providing a first shear web part having a third shear wall attaching, preferably adhesively, the upper interior strip to the lower interior strip. The third shear wall may preferably be formed integrally with the upper interior strip and the lower interior strip in one piece.

Additionally or alternatively, the method may comprise a step of:

providing a third fibre material, optionally one or more third elongated fibre-reinforced elements, and a third female mould with a third mould surface having a third left wall face, a third floor face, and a third right wall face arranged opposite of the third left wall face, the third wall faces extending upwards from the third floor face;

arranging the third fibre material and optionally the one or more third elongated fibre-reinforced elements on the third mould surface of the third mould;

infusing the third fibre material, and optionally co-infusing the one or more third elongated fibre-reinforced elements, with a third resin material, such as an epoxy or a polyester, preferably by a vacuum assisted resin infusion process; and curing the third fibre material, and optionally the one or more third elongated fibre-reinforced elements, to provide the first shear web part formed integrally in one piece.

A person skilled in the art will appreciate that any one or more of the above aspects of this disclosure and embodiments thereof may be combined with any one or more of the other aspects of this disclosure and embodiments thereof.

BRIEF DESCRIPTION OF THE DRAWINGS

Embodiments of this disclosure will be described in more detail in the following with regard to the accompanying figures. The figures show one way of implementing the present invention and are not to be construed as being limiting to other possible embodiments falling within the scope of the attached claim set.

FIG. 1 is a schematic perspective view of a wind turbine.

FIG. 7b is a schematic cross-sectional view of FIG. 7a

DETAILED DESCRIPTION OF THE INVENTION

Figure 1:
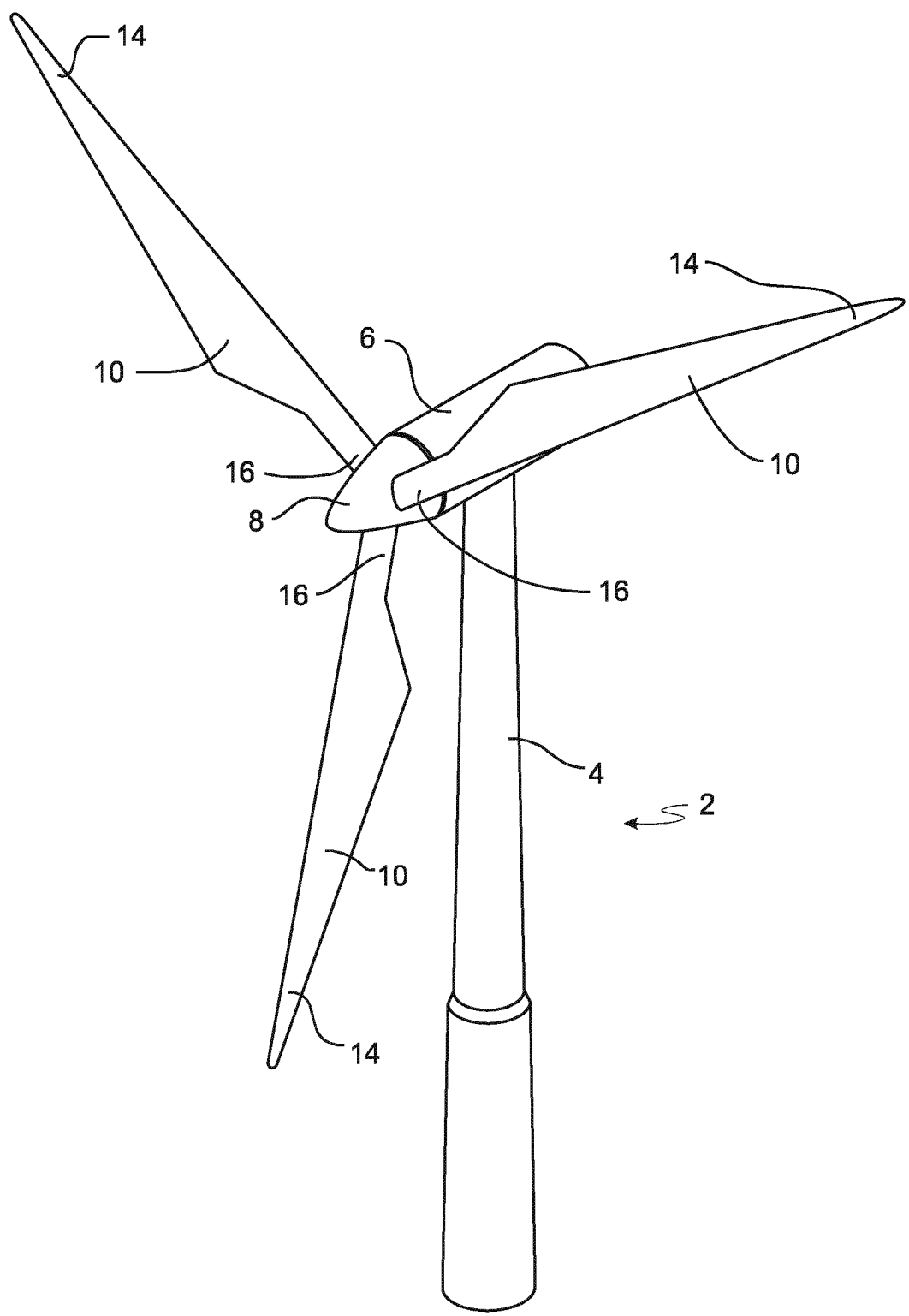

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8.

Figure 2:
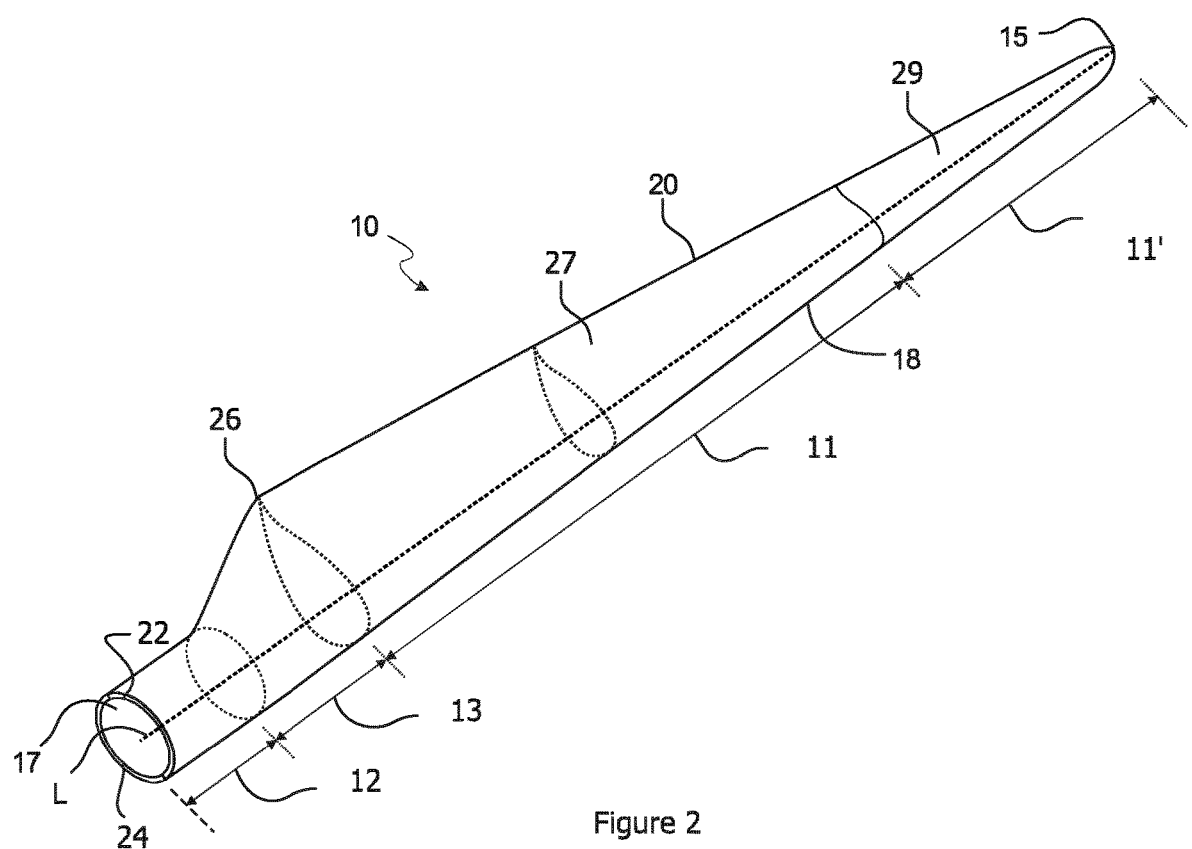
FIG. 2 is a schematic perspective view of a segmented wind turbine blade.

FIG. 2 shows a schematic view of a wind turbine blade 10. The wind turbine blade 10 has the shape of a conventional wind turbine blade and comprises a root region 12 closest to the hub, a profiled or an airfoil region 11 farthest away from the hub and a transition region 13 between the root region 12 and the airfoil region 11. The blade 10 comprises a leading edge 18 facing the direction of rotation of the blade 10, when the blade is mounted on the hub, and a trailing edge 20 facing the opposite direction of the leading edge 18. The outermost point of the blade 10 is the tip end 15.

The airfoil region 11 (also called the profiled region) has an ideal or almost ideal blade shape with respect to generating lift, whereas the root region 12 due to structural considerations has a substantially circular or elliptical cross-section, which for instance makes it easier and safer to mount the blade 10 to the hub. The diameter (or the chord) of the root region 12 may be constant along the entire root area. The transition region 13 has a transitional profile gradually changing from the circular or elliptical shape of the root region 12 to the airfoil profile of the airfoil region 11. The chord length of the transition region 13 typically increases with increasing distance r from the hub. The airfoil region 11 has an airfoil profile with a chord extending between the leading edge 18 and the trailing edge 20 of the blade 10. The width of the chord decreases with increasing distance r from the hub 8.

A shoulder 26 of the blade 10 is defined as the position where the blade 10 has its largest chord length. The shoulder 26 is typically provided at the boundary between the transition region 13 and the airfoil region 11. The outermost third of the airfoil region 11 is typically referred to as the tip region 11'. FIG. 2 also illustrates the longitudinal direction L defining longitudinal extent of the blade.

Figure 3A:
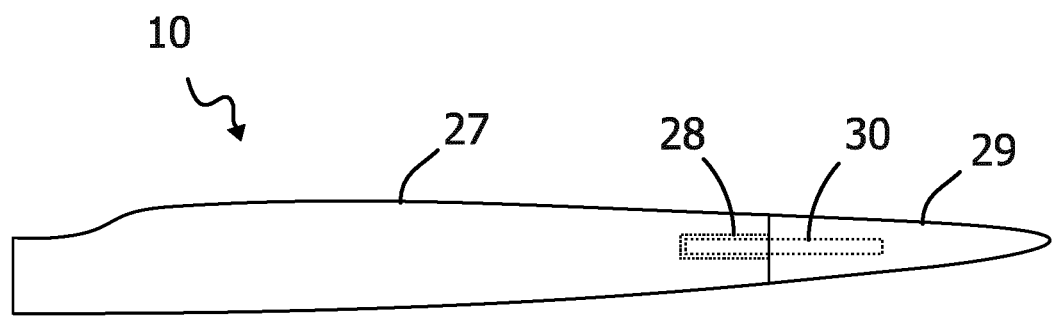
FIG. 3a is a schematic side view of a segmented wind turbine blade.

FIG. 3a schematically illustrates a segmented wind turbine blade 10. It is made up at least of a root segment 27 and a tip segment 29 divided at a chordwise joint. To allow joining of the root segment 27 with the tip segment 29, the two segments 27, 29 may comprise a female receiving section 28 and a mating male spar beam 30 inserted into and engaging with the female receiving section 28. The female receiving section 28 and the male spar beam 30 are fixed together via a locking arrangement, see FIGS. 4a-4c, at the chordwise joint with a pin.

Figure 3B:
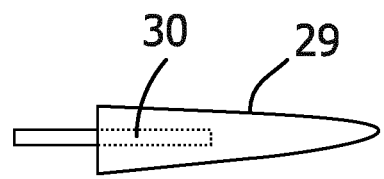
FIG. 3b is a schematic view of a tip segment for a segmented wind turbine blade.

FIG. 3b illustrates the tip segment 29 of the segmented blade 10 shown in the previous figures. Aside from the shell that forms the aerodynamic profile of the blade 10, the tip segment 29 further comprises the male spar beam 30 as described above. The male spar beam 30 of the tip segment protrudes beyond (outside) the tip segment shell at the chordwise joint to allow the male spar beam to engage with a corresponding female receiving section 28 arranged in the root segment 27.

Figure 3C:
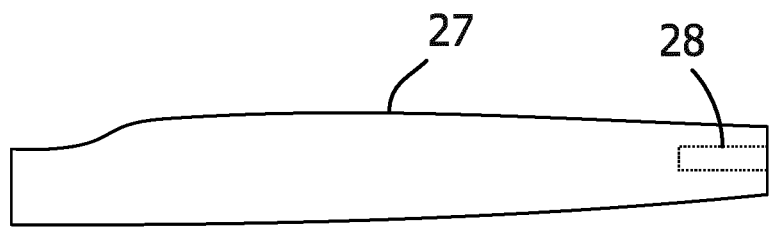
FIG. 3c is a schematic view of a root segment for a segmented wind turbine blade.

FIG. 3c illustrates the root segment 27 of the segmented blade 10. As described above, the root segment 27 comprises a female receiving section 28 for receiving the male spar beam 30 of the tip segment 29 in order to allow the root segment 27 and the tip segment 29 to be securely joined together. The final blade is obtained by mating the male spar beam 30 with the female receiving section 28, securing the two together at the chordwise joint, sealing the region where the blade segments 27, 29 meet, and providing any finishing touches to the blade.

Figure 4A:
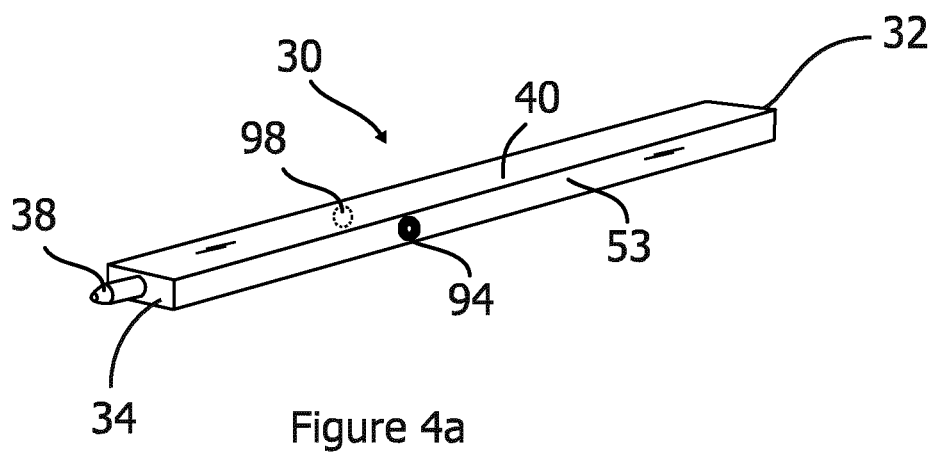
FIG. 4a is a schematic view of a male spar beam for a pin joint in a segmented wind turbine blade.

FIG. 4a is a schematic illustration of a male spar beam 30 for a pin joint for a segmented wind turbine blade 10. In addition to the beam as such, the male spar beam has reinforcement structures each having a receiving portion 94, 98 in the form of holes for receiving a pin. Furthermore, this spar beam 30 has an engagement member 38 in the form of a bolt that will engage with a receiving portion 28b in the form of a slot in the female receiving section 28 to improve stability, see FIGS. 4b-4c. This contributes to reducing unwanted motion between the male spar beam 30 and the female receiving section 28 during use.

Figure 4B:
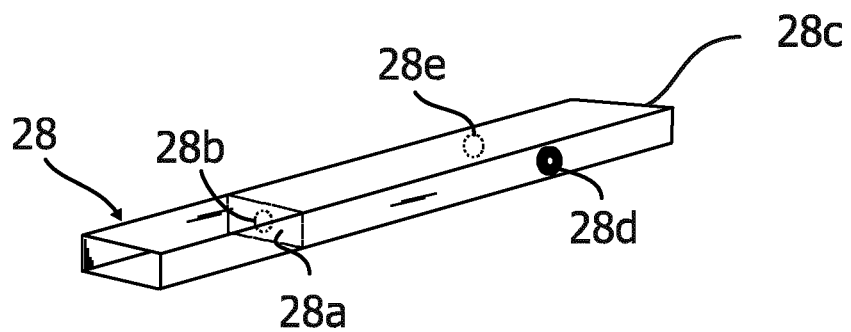
FIG. 4b is a schematic view of a female receiving section for a pin joint in a segmented wind turbine blade.

FIG. 4b is a schematic illustration of a female receiving section 28 for engaging with the male spar beam 30 shown in FIG. 4a. The female receiving section 28 defines an inner cavity and has a longitudinal inner end 28a and an opposite longitudinal open end 28c at an end face of the first blade segment 27. Like the male spar beam 30, the female receiving section 28 comprises receiving portions 28d, 28e in the form of holes for receiving a pin. The inner end 28a is provided in the form of a plate with a slot 28b configured to fit tightly with the engagement member 38 of the male spar beam 30. When the engagement member 38 is engaged with the slot 28b, chordwise movement of the male spar beam relative to the female receiving section 28 is inhibited. The position of slot 28b, receiving portions 28d, 28e, 94, 98, and the shape and size of the male spar beam 30 and the female receiving section 28 are not essential for the present invention.

Figure 4C:
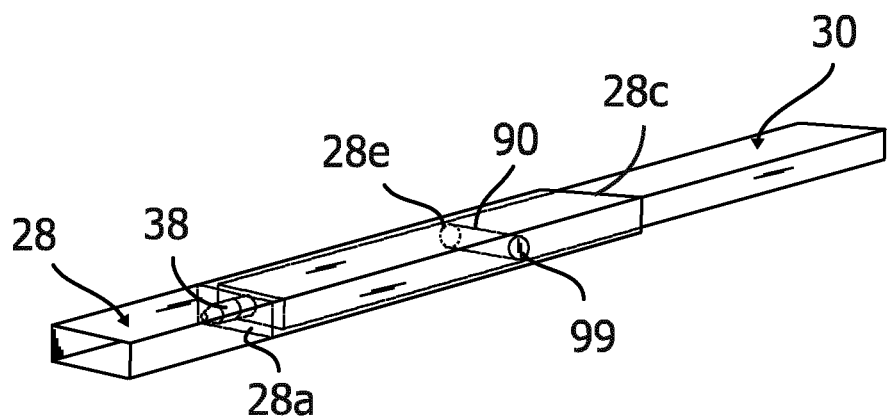
FIG. 4c is a schematic view of a pin joint female receiving section mated with a corresponding pin joint spar beam.

FIG. 4c shows the female receiving section 28 and male spar beam 30 engaged, with the male spar beam 30 inserted through the longitudinal open end 28c of and into the cavity of the female receiving section 28 to be received therein. The engagement member 38 is engaged with the receiving portion 28b of the female receiving section 28 to prevent chordwise movements. An engagement element 99 is shown engaging with receiving portions 28d, 28e, 94, 98 to mutually lock the tip segment 27 and the root segment 29 and maintaining joint connection under centrifugal/centripetal forces.

Figure 5A:
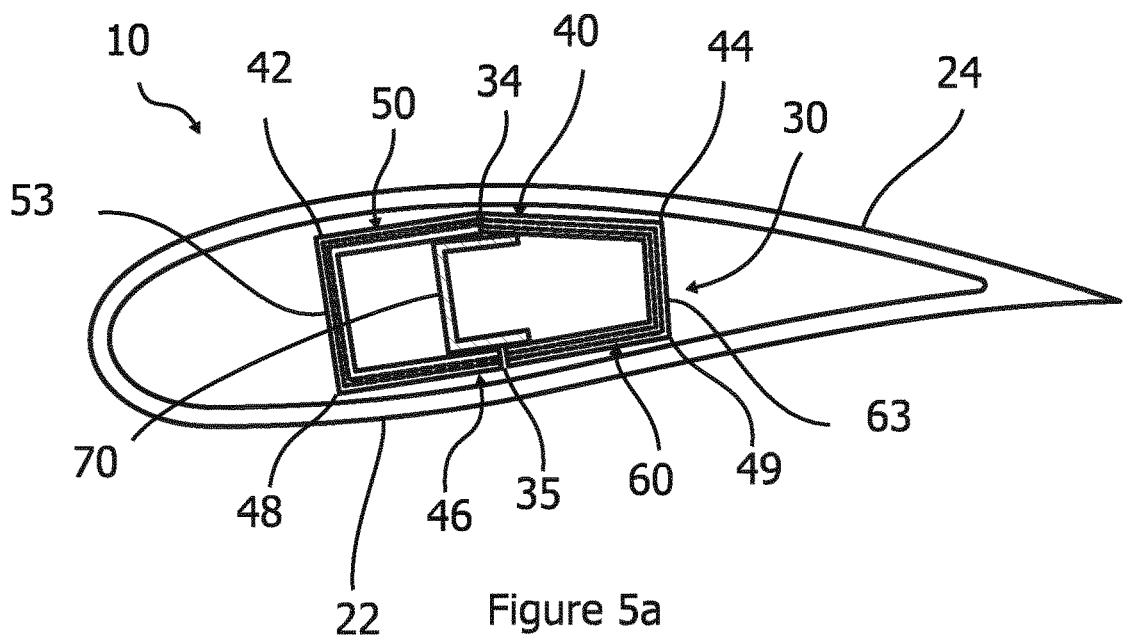
FIG. 5a is a schematic cross-sectional view of a male spar beam incorporated in a blade segment.

FIG. 5a illustrates the male spar beam 30 incorporated into the segmented wind turbine blade 10 in a cross-sectional view. The male spar beam 30 is arranged in the interior cavity of the segmented wind turbine blade. The male spar beam extends in three mutually perpendicular directions: a longitudinal direction (extending in and out of plane on FIG. 5a), a lateral direction (extending from left-right on FIG. 5a) and a thickness direction (extending up-down on FIG. 5a). The longitudinal direction of the male spar beam is parallel to the longitudinal direction of the segmented wind turbine blade 10. The lateral direction is parallel to the chordwise direction of the segmented wind turbine blade 10. The thickness direction is parallel to a thickness direction of the segmented wind turbine blade 10 extending between the suction side and the pressure side of the segmented wind turbine blade 10.

Furthermore, the male spar beam 30 comprises an upper spar cap 40 adjacent to the suction side 24 and extending in the longitudinal direction. The upper spar cap 40 has a width bounded by a left upper boundary 42 and a right upper boundary 44 thereof. The upper spar cap 40 has an upper joint 34 connecting two halves of the upper spar cap 40. The upper joint 34 is arranged between the upper boundaries 42, 44. The male spar beam 30 further comprises a lower spar cap 46 adjacent to the pressure side 22 and is positioned opposite of and extending in parallel to the upper spar cap 40. The lower spar cap 46 has a width bounded by a left lower boundary 48 and a right lower boundary 49 thereof. The lower spar cap 46 has a lower joint 35 arranged between the left lower boundary 48 and the right lower boundary 49. The wind turbine blade 10 may typically, in addition to the male spar beam 30, comprise additional spar caps (often embedded in the shells) with one or more connecting shear webs. There may be some overlap between these additional spar caps embedded in the shells and the spar caps of the male spar beam 30.

In the present embodiment, the male spar beam 30 is made of three separately manufactured fibre-reinforced laminate composite parts: a leading-edge part 50, a trailing-edge part 60, and a first shear web part 70. An example of a method of manufacturing such a male spar beam is now described in more detail.

Figure 5B:
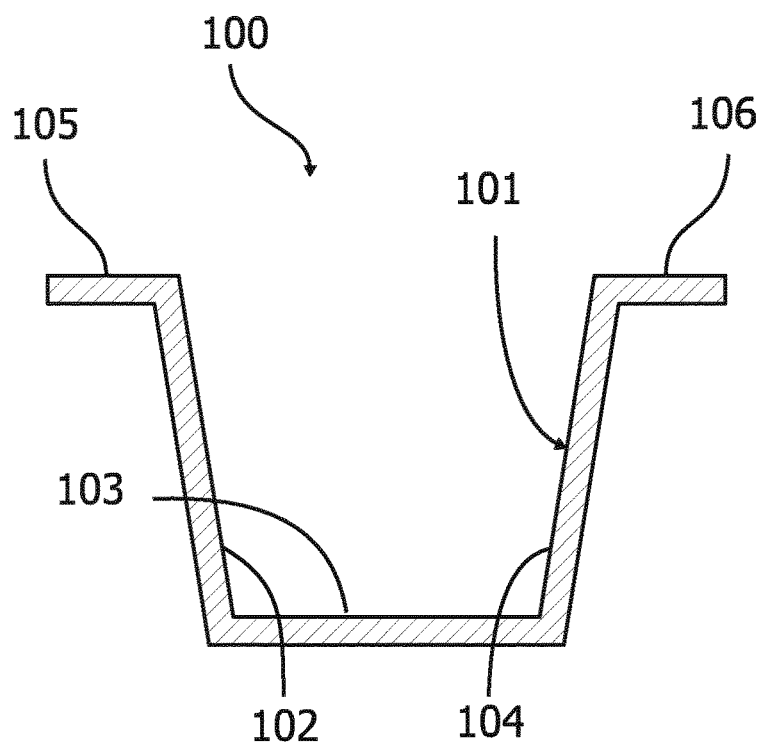
FIG. 5b is a schematic cross-sectional view of a female mould for moulding a leading-edge part or trailing edge-part of the male spar beam.

FIG. 5b schematically illustrates a female mould 100 with a mould surface 101 having a left wall face 102 for forming a part of a spar cap, a floor face 103 for forming a shear wall, a right wall face 104 for forming a part of a different spar cap, a left flange face 105 adjacent to the first left wall face 102, and a right flange face 106 adjacent to the first right wall face 104. The right wall face 104 is arranged opposite of the left wall face 102. The wall faces 102, 104 extend upwards from the floor face 103. The wall faces 102, 104 may have a slight positive draft angle to ease removal of the moulded part. The female moulds 100 for the leading-edge part 50 and the trailing-edge part 60 is in this case substantially the same with some dimensional differences to fit to the specific segmented blade 10.

Figure 6A:
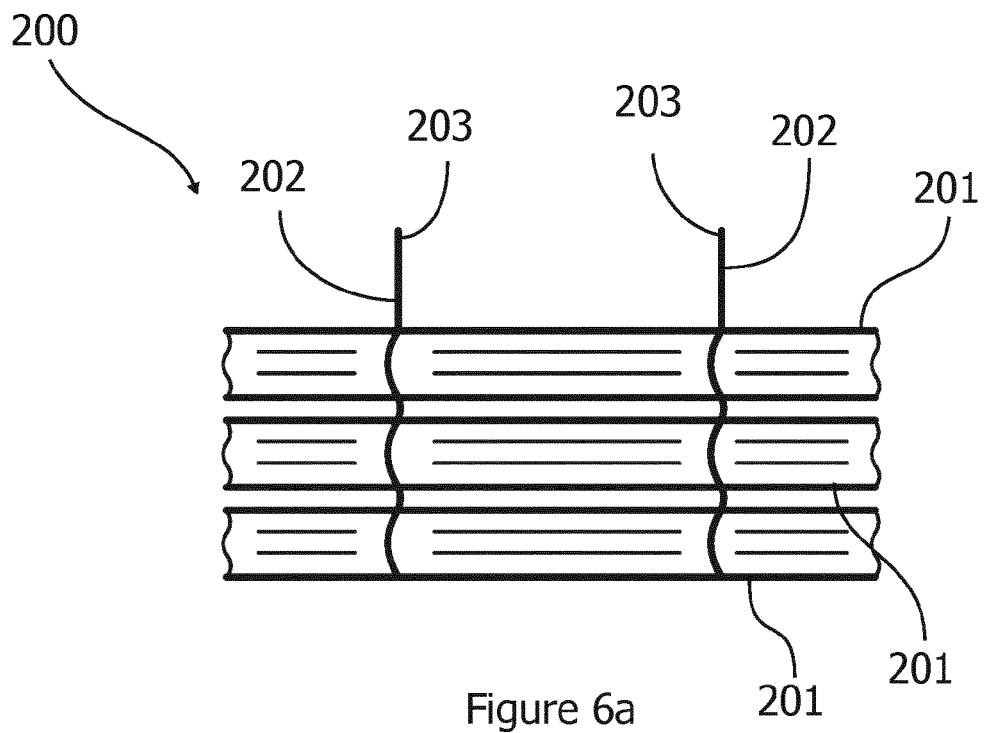
FIG. 6a is a schematic side view of a reinforcement arrangement for use in moulding of the male spar beam.
Figure 6B:
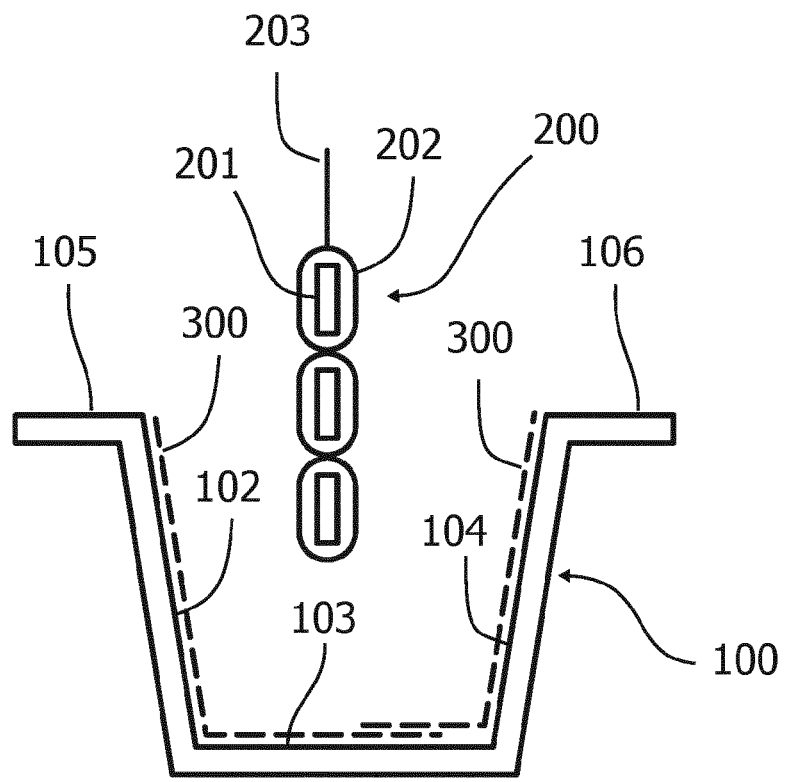
FIG. 6b is a schematic view of a step of arranging elongated fibre-reinforced elements and fibre material in the female mould.

FIG. 6a schematically illustrates a reinforcement arrangement 200 provided to form the main load-carrying structure of the spar caps. The reinforcement arrangement 200 comprises a plurality of elongated fibre-reinforced elements in the form of pultrusions 201 and a plurality of threads 202 suspending the pultrusions 201 in a parallel orientation from an end 203 of each thread 202 as shown.

Both of the leading-edge part 50 and the trailing-edge part 60 can be separately moulded in the following way. As best seen in FIG. 6a, a fibre material 300, e.g. a glass fibre sheet, is laid up to cover the left wall face 102, the floor face 103, and the right wall face 104 of the female mould 100. Then a reinforcement arrangement 200 as previously shown is lowered into the female mould 100 and the ends 203 of the threads 202 are attached to the left flange face 105 of the female mould 100 to hang the pultrusions 201 along the fibre material 300 laid against the left wall face 102 of the female mould 100. This is repeated with another reinforcement arrangement 200 which is hung from the right flange face 106 against the fibre material laid against the right wall face 104.

Figure 7A:
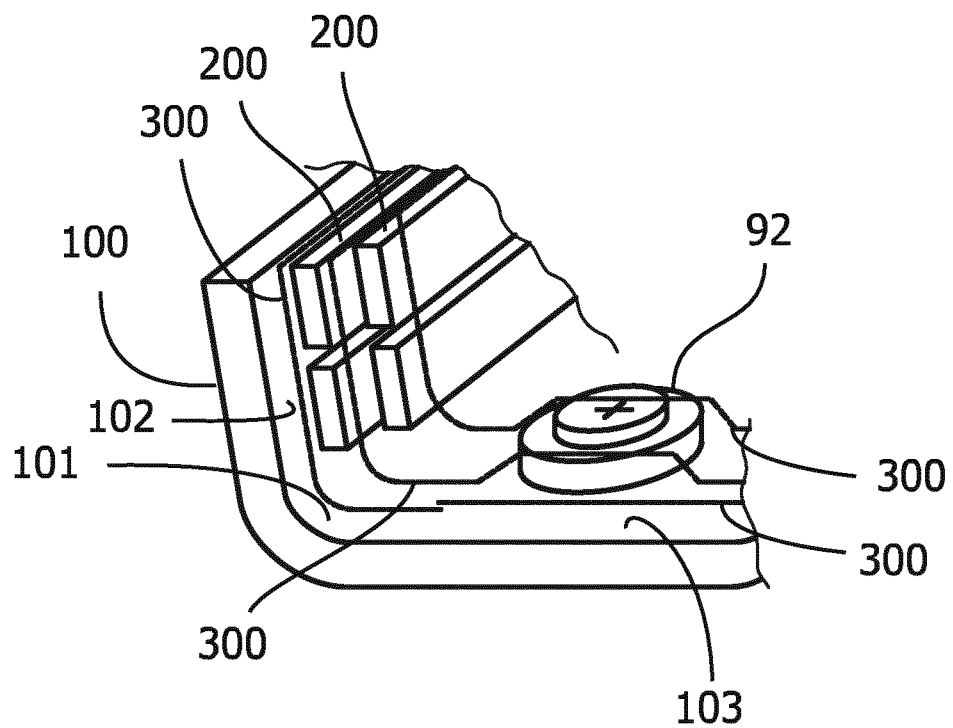
FIG. 7a is a schematic perspective view of a step of incorporating a reinforcement structure in a shear wall during manufacture of the male spar beam.
Figure 7B:
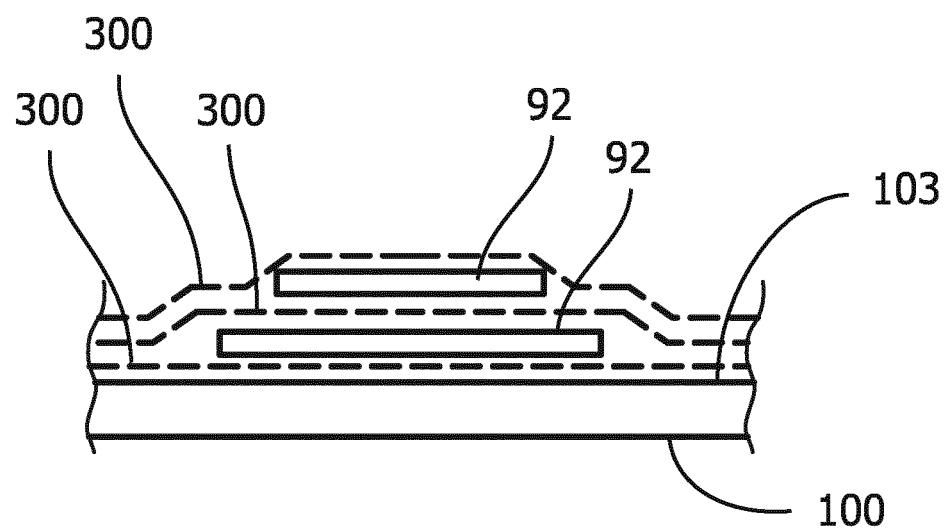

If reinforcement structures are desired in the male spar beam 30, then such a reinforcement structure 92 may be incorporated as shown in FIGS. 7a-7b. A reinforcement structure 92 in the form of a disk or ring may be arranged on the fibre material 300 (shown transparent in FIG. 7a to allow other elements to be seen) laid against the floor face 103 of the female mould 100. Such a reinforcement structure 92 may comprise a receiving portion for a pin or bolt or such a receiving portion, as in this case, may be provided, e.g. cut, after moulding of the respective part 50, 60.

Figure 8A:
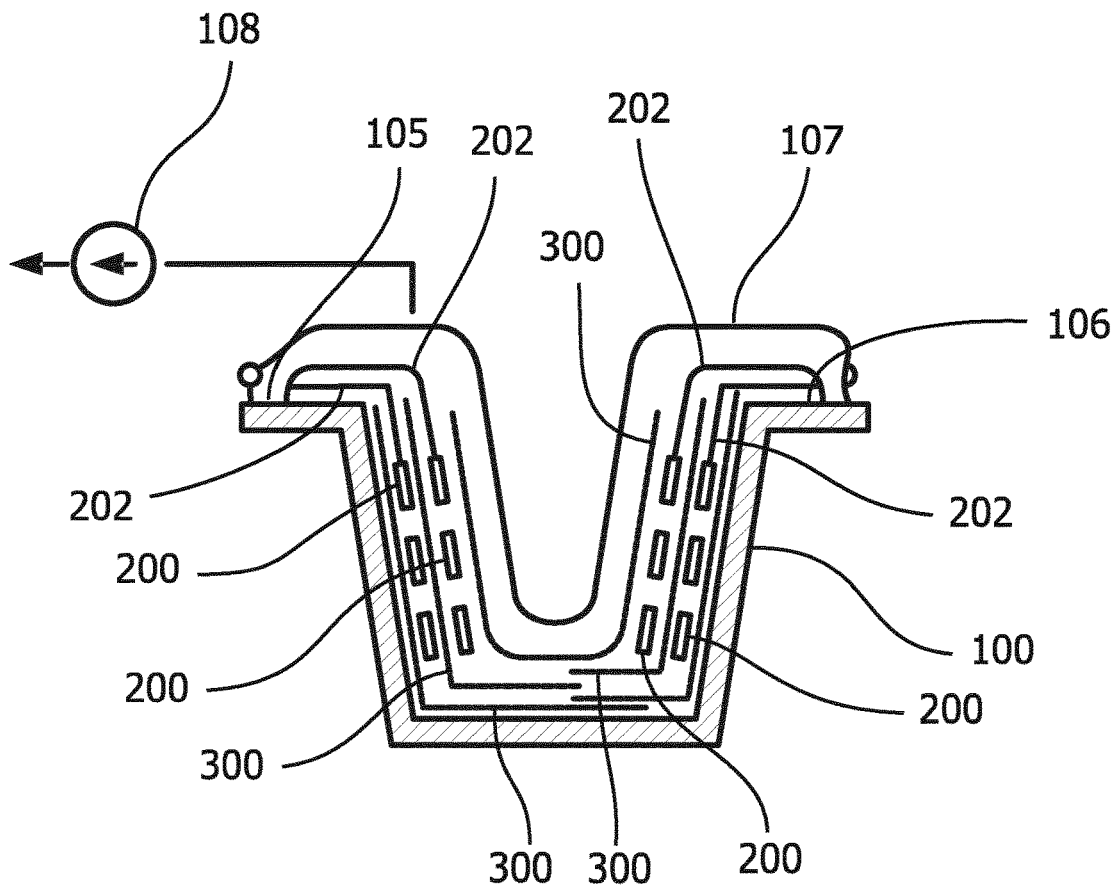
FIG. 8a is a schematic view of a step of infusing the leading-edge part by a vacuum assisted resin transfer process.

The reinforcement arrangements 200 previously placed, and any reinforcement structures, may then be covered by additional fibre material 300, e.g. glass fibre sheets. Additional reinforcement arrangements 200 may be placed in the female mould 100 in the same way as previously described and then covered by additional fibre material 300. Preferably, there is at least one layer of fibre material 300 between adjacent reinforcement arrangements 200. This arrangement is best schematically seen in FIG. 8a. If the fibre material 300 is not pre-impregnated, a bag 107 may instead seal the female mould 100 and is connected to a vacuum source 108, e.g. a pump. The respective part 50, 60 is then infused using a vacuum assisted resin transfer infusion process. If the fibre material is pre-impregnated, it may be cured in an oven or an autoclave.

Figure 8B:
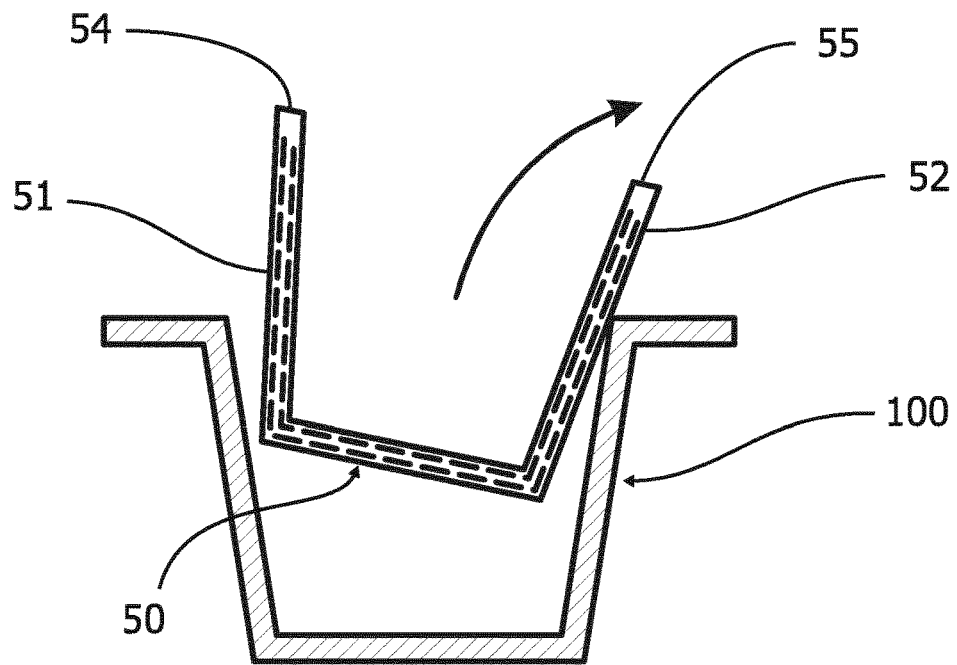
FIG. 8b is a schematic view of a step of removing the leading-edge part from the first mould after curing thereof.

After curing, the part can be removed from the female mould 100. FIG. 8b illustrates this after curing of the leading-edge part 50 in the respective female mould 100. The step is substantially the same for removing the trailing-edge part 60 from its female mould. As seen, leading-edge part 50 is C-shaped or [-shaped in a cross-section perpendicular to the longitudinal direction as illustrated in FIG. 8b. After removal, the leading-edge part 50 and correspondingly the trailing-edge part 60 can be separately inspected for e.g. quality defects, and further components can be installed in the interior space, e.g. on the interior surface 56.

Figure 9A:
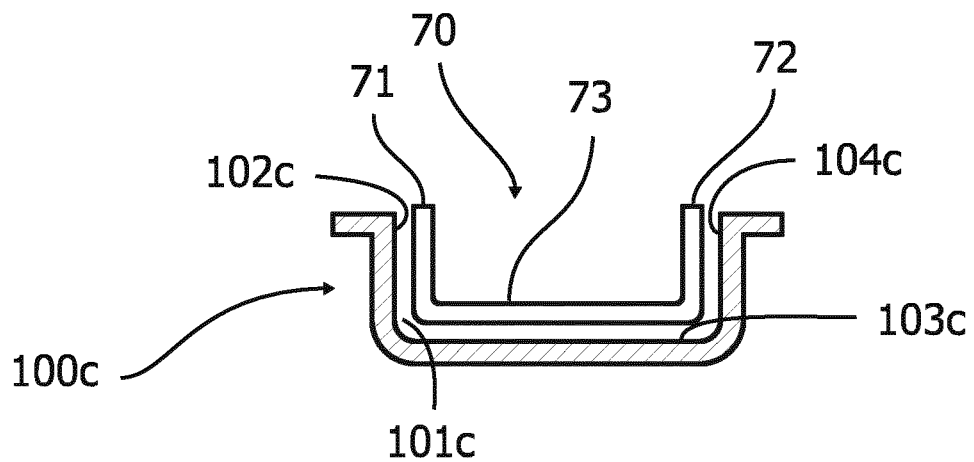
FIG. 9a is a schematic cross-sectional view of a third female mould for moulding a first shear web part.

The first shear web part 70 is manufactured in a third female mould 100c as shown in FIG. 9a separately from the leading-edge part 50 and the trailing-edge part 60. The third female mould 100c is of the same type as the previously described female mould 100 only differing in dimensions, i.e. being shorter in height and width and having a neutral draft angle. The process of moulding the first shear web part 70 is the same as for the leading-edge part 50 and trailing-edge part 60. The first shear web part 70 is integrally moulded in one piece to comprise an upper interior strip 71, lower interior strip 72, and a third shear wall 73 connecting the upper interior strip 71 and the lower interior strip 72. The upper interior strip 71 moulded against the left wall face 102c of the third female mould 100c. The lower interior strip 72 is moulded against the right wall face 104c of the third female mould 100c. The third shear wall 73 is moulded against the floor face 103c of the third female mould 100c. In some cases, the interior strips 71, 72 and third shear wall 73 may be moulded separately but in this case, the first shear web part 70 is a composite laminate structure, e.g. consisting substantially of glass fibres and polyester resin, but may in other cases comprise carbon fibres and/or pultrusions. After moulding, the first shear web part 70 can be separately inspected for e.g. quality defects.

Figure 9B:
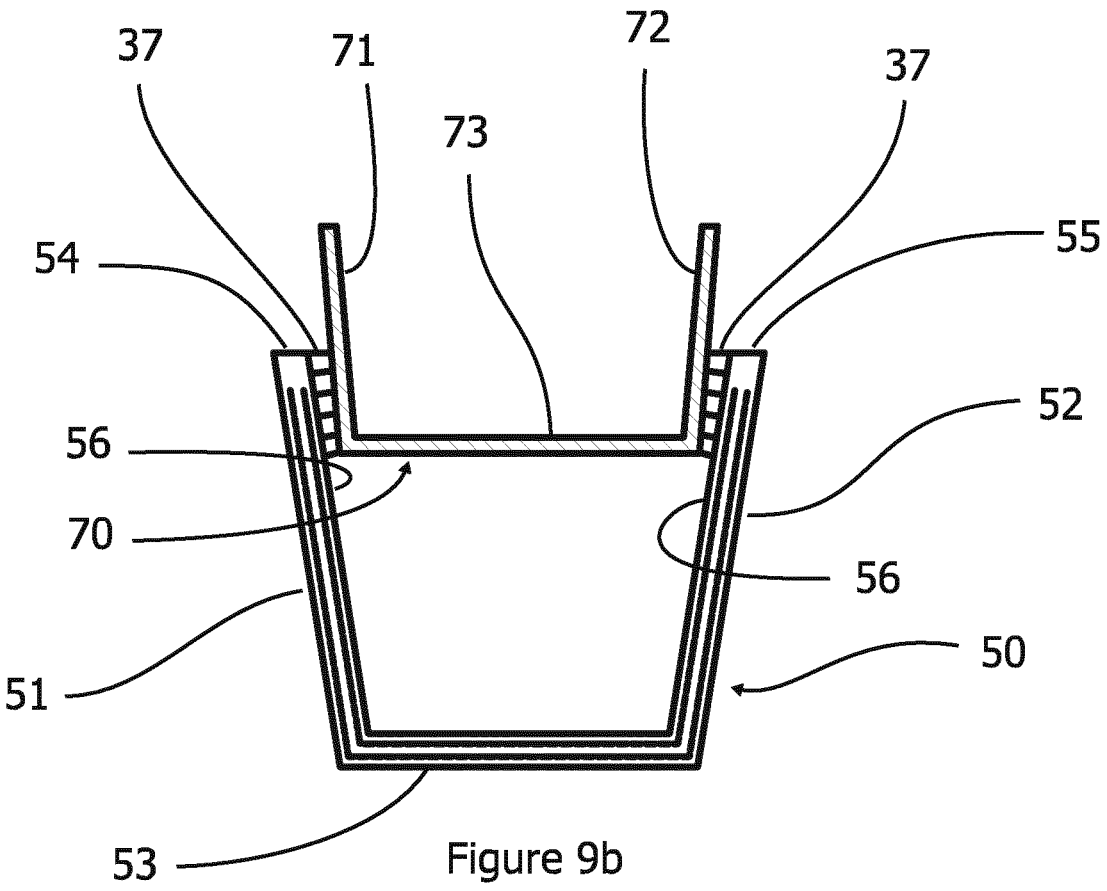
FIG. 9b is a schematic cross-sectional view of a step of attaching the first shear web part to the leading-edge part.

The first shear web part 70 can now be attached to the leading-edge part 50 or the trailing edge-part 60. The case of attaching to the leading-edge part 50 is illustrated in FIG. 9b, but the case of attaching to the trailing-edge part 60 is substantially the same. As shown in FIG. 9b, the first shear wall 53 of the leading-edge part 50 is arranged to rest on a work surface (not shown) so that the leading-edge part forms a U-shape as shown. An adhesive 37 is then applied to the interior surface 56 adjacent to the end 54 of the first upper wall 51 and adjacent to the end 55 of the first lower wall 52. The first shear web part 70 is then lowered with its shear wall 73 first into the leading-edge part 50 between the ends 54, 55 of the first walls 51, 52 so that the upper interior strip 71 partially overlaps with the first upper wall 51 and the lower interior strip 72 partially overlaps with the first lower wall 52. The shear web part is then brought into contact with the adhesive 37 to adhere the upper interior strip 71 to the first upper wall 51 and the lower interior strip 72 to the first lower wall 52, thereby adhering the first shear web part 70 to the leading-edge part 50 to form a sub-assembly. When the sub-assembly of the leading-edge part 50 and first shear web part 70 have passed inspection, the trailing-edge part 60 can be gathered.

Figure 10A:
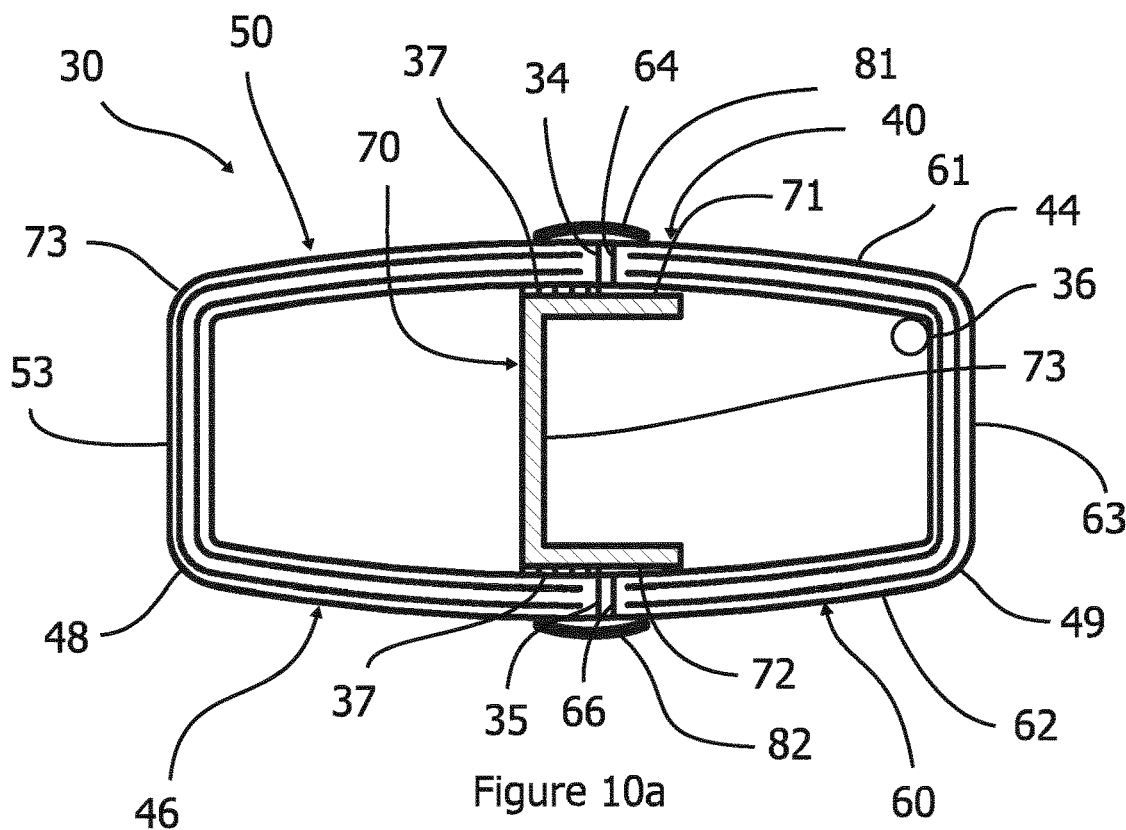
FIG. 10a is a schematic cross-sectional view of the male spar beam after assembly.

As illustrated in FIG. 10a, an adhesive, optionally different from the previously used, is then applied to the ends 54, 55 of the first walls 51, 52, and optionally to the free ends of the interior strips 71, 72. Ends 64, 65 of the second walls 61, 62 of the trailing-edge part 60 are then brought into contact with said adhesive on the ends 54, 55 of the first walls 51, 52 of the leading-edge part 50 to form an upper adhesive butt joint 34 and a lower adhesive butt joint 35 thereby attaching the trailing-edge part 60 to the sub-assembly having the leading-edge part 50 and the first shear web part 70. Thus, the first upper wall 51 and the second upper wall 61 connected by the upper joint 34 form an upper spar cap 40 of the male spar beam 30, and the first lower wall 52 and the second lower wall 62 connected by the lower joint 35 form a lower spar cap 46 of the male spar beam 30. Prior to assembly with the leading-edge part 50, a lightning protection component 36 in the form of a down conductor was installed in the trailing-edge part 60. In this case, the upper joint 34 and the lower joint 35 are positioned at about half the width of the respective spar caps 40, 46 between their respective upper boundaries 42, 44 and lower boundaries 48, 49.

It should be noted that the order of manufacturing the leading-edge part 50 and the trailing-edge part 60 is not essential. Thus, the above described method of manufacturing could instead be the trailing-edge part 60 being manufactured first and the first shear web part 70 being attached thereto and the leading-edge part 50 being attached at the final steps to form the male spar beam 30.

To form the male spar beam 30, an upper exterior strip 81 is arranged to cover the exterior of the upper joint 34 and adhered exteriorly on the upper walls 51, 61 and a lower exterior strip 82 is arranged to cover the exterior of the lower joint 35 and adhered exteriorly on the lower walls 52, 62 thus arriving at the arrangement shown in FIG. 10a where the upper elements 51, 61, 71 are arranged upwards and the lower elements 52, 62, 72 are arranged downwards.

Figure 10B:
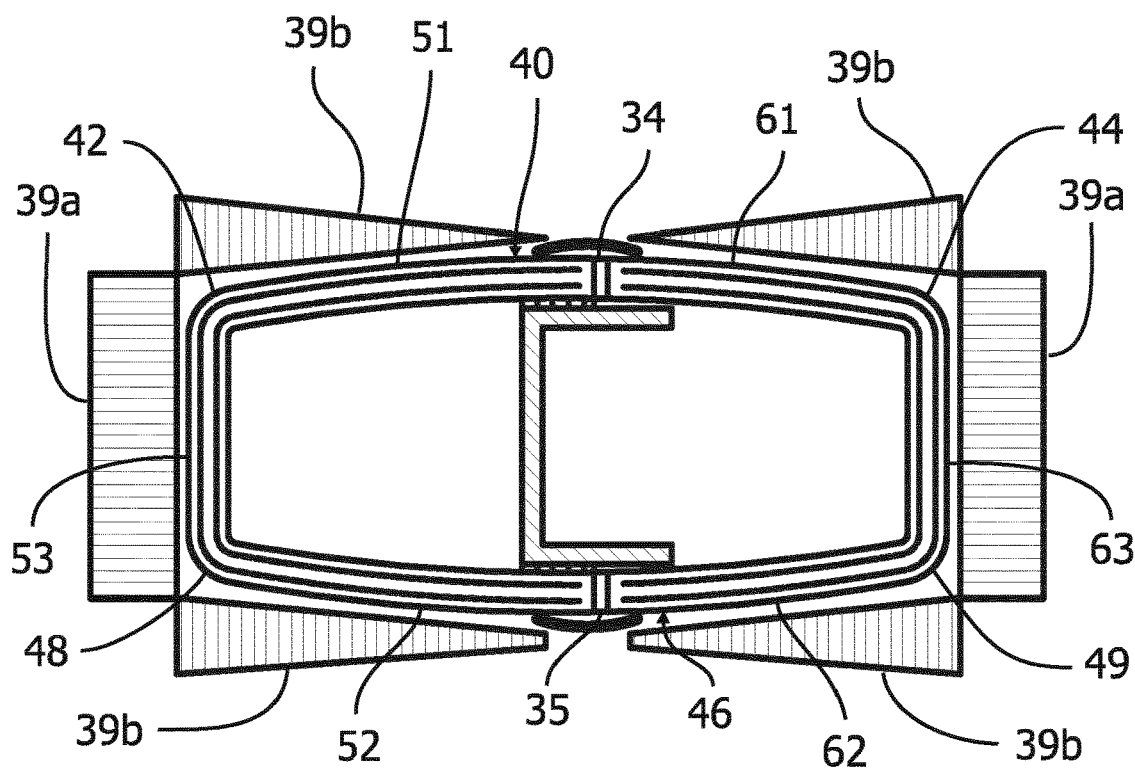
FIG. 10b is a schematic cross-sectional view of the male spar beam illustrating the distribution of shear stresses on the male spar beam.

FIG. 10b illustrates the distribution of shear stress experienced by the male spar beam 30 during primary flapwise loading. As seen, the shear stress 39a is highest in the first shear wall 53 and second shear wall 63 while the shear stress 39b experienced by the spar caps 40, 46 tapers from the respective boundaries 42, 44, 48, 49 towards a midpoint between the respective boundaries 42, 44, 48, 49 of the spar caps 40, 46. As seen, the upper joint 34 and the lower joint 35 is arranged at the position of minimum shear stress to reduce the loading experienced by the joints 34, 35 (which is typically weaker than the remaining parts of the spar caps).

Figure 11:
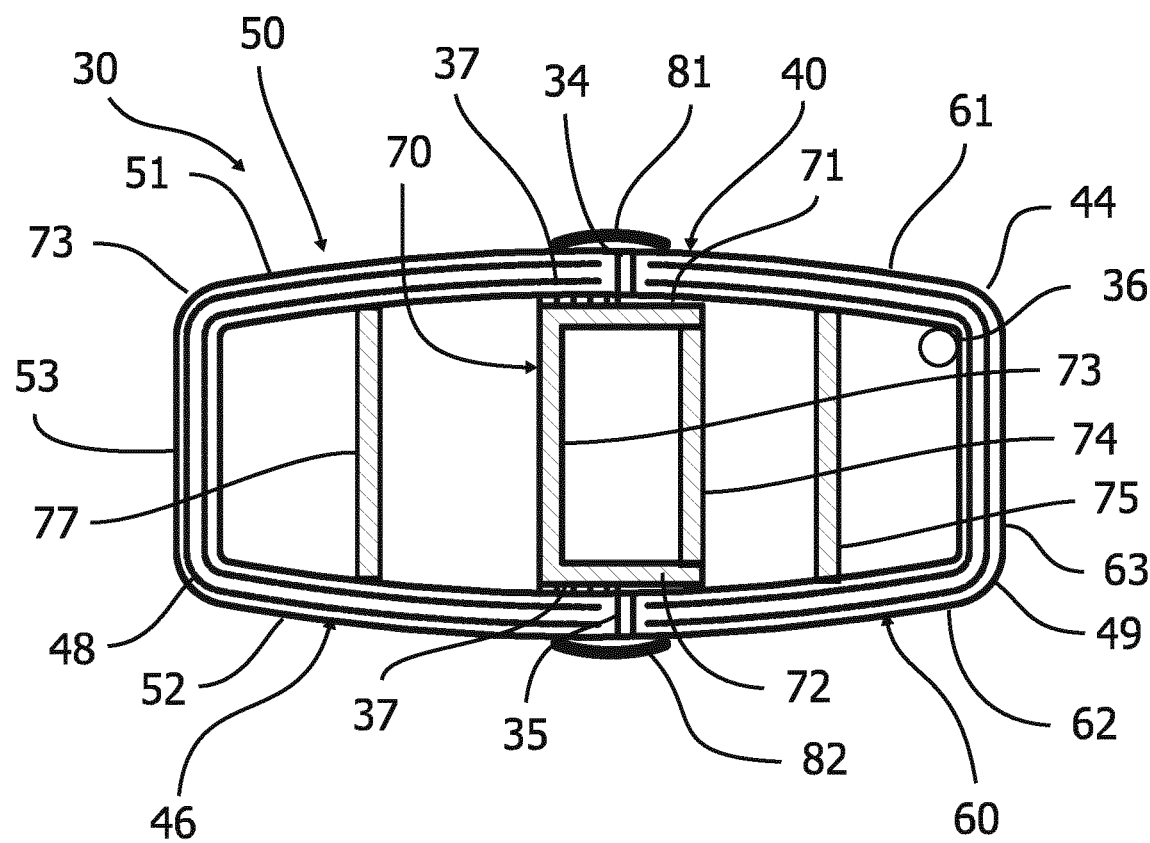
FIG. 11 is a schematic cross-sectional view of the male spar beam with additional shear web parts and walls incorporated therein.

FIG. 11 illustrates another embodiment of a male spar beam 30 corresponding to the spar beam 30 previously described but differing in that the first shear web part 70 comprises a fourth shear wall 74 arranged opposite of the third shear wall 73 closing off the first shear web part 70 to define a box shape. This embodiment, further has an additional shear web part: a second shear web part 75 adhesively attaching the interior surface of the second upper wall 61 and the second lower wall 62 to provide additional shear stiffness and/or buckling strength, and a third shear web part 77 adhesively attaching the interior surface of the first upper wall 51 and the first lower wall 52 to provide additional shear stiffness and/or buckling strength. These additional shear web parts 75, 77 can be incorporated into the respective trailing-edge part 60 and the leading-edge part 50 prior to final assembly of the male spar beam 30 and is thus easy to incorporate.

| LIST OF REFERENCES | |
|---|---|
| 2 | wind turbine |
| 4 | tower |
| 6 | nacelle |
| 8 | hub |
| 10 | segmented wind turbine blade |
| 11 | airfoil region |
| 11' | tip region |
| 12 | root region |
| 13 | transition region |
| 14 | blade tip |

LIST OF REFERENCES

| | |
|---|---|
| 15 | tip end |
| 16 | blade root |
| 17 | root end |
| 18 | leading edge |
| 20 | trailing edge |
| 21 | chordwise joint |
| 22 | pressure side |
| 24 | suction side |
| 26 | shoulder |
| 27 | root segment |
| 28 | female receiving section |
| 28a | inner end |
| 28b | receiving portion |
| 28c | open end |
| 28d | first receiving portion |
| 28e | second receiving portion |
| 29 | tip segment |
| 30 | male spar beam |
| 32 | first end |
| 33 | second end |
| 34 | upper joint |
| 35 | lower joint |
| 36 | lightning protection component |
| 37 | adhesive |
| 38 | engagement member |
| 39 | shear stress |
| 40 | upper spar cap |
| 42 | left upper boundary |
| 44 | right upper boundary |
| 46 | lower spar cap |
| 48 | left lower boundary |
| 49 | right lower boundary |
| 50 | leading-edge part |
| 51 | first upper wall |
| 52 | first lower wall |
| 53 | first shear wall |
| 54 | first upper wall end |
| 55 | first lower wall end |
| 56 | interior surface |
| 60 | trailing-edge part |
| 61 | second upper wall |
| 62 | second lower wall |
| 63 | second shear wall |
| 64 | second upper wall end |
| 65 | second lower wall end |
| 70 | first shear web part |
| 71 | upper interior strip |
| 72 | lower interior strip |
| 73 | third shear wall |
| 74 | fourth shear wall |
| 75 | second shear web part |
| 77 | third shear web part |
| 81 | upper exterior strip |
| 82 | lower exterior strip |
| 90 | locking arrangement |
| 92 | first reinforcement structure |
| 94 | first receiving portion |
| 96 | second reinforcement structure |
| 98 | second receiving portion |
| 99 | engagement element |
| 100 | female mould |
| 101 | mould surface |
| 102 | left wall face |
| 103 | floor face |
| 104 | right wall face |
| 105 | left flange face |
| 106 | right flange face |
| 107 | bag |
| 108 | vacuum source |
| 300 | fibre material |
| 200 | reinforcement arrangement |
| 201 | pultrusion |
| 202 | thread |
| 203 | end |
| 300 | fibre material |

The invention claimed is:

1. A male spar beam for engaging with a female receiving section of a first blade segment of a segmented wind turbine blade and for attachment to a second blade segment of the segmented wind turbine blade and, the segmented wind turbine blade having a profiled contour including a pressure side and a suction side, and a leading edge and a trailing edge with a chordwise direction extending therebetween, the segmented wind turbine blade extending in a longitudinal direction from a root end to a tip end thereof, wherein the male spar beam extends in a longitudinal direction extending from a first end to a second end thereof, the second end being configured for engaging with the female receiving section of the segmented wind turbine blade, and wherein the male spar beam comprises:

an upper spar cap extending in the longitudinal direction, having a width bounded by a left upper boundary and a right upper boundary, and having an upper joint arranged between the left upper boundary and the right upper boundary, and being configured for facing one of the pressure side and the suction side of the segmented wind turbine blade;

a lower spar cap extending in the longitudinal direction, and having a width bounded by a left lower boundary and a right lower boundary, having a lower joint arranged between the left lower boundary and the right lower boundary, and being configured for facing the other one of the pressure side and the suction side of the segmented wind turbine blade, the lower spar cap being positioned opposite of and extending in parallel to the upper spar cap;

a leading-edge part comprising a first upper wall, a first lower wall, and a first shear wall connecting the first upper wall with the first lower wall, the leading-edge part being formed integrally in one piece in a first female mould (100) and comprising a fibre-reinforced laminate material; and a trailing-edge part comprising a second upper wall, a second lower wall, and a second shear wall connecting the second upper wall with the second lower wall, the trailing-edge part being formed integrally in one piece in a second female mould (100) separately from the leading-edge part and comprises a fibre-reinforced laminate material, wherein an end of the first lower wall of the leading-edge part is attached to an end of the second lower wall of the trailing-edge part to form the lower joint so that the first lower wall and the second lower wall form the lower spar cap of the male spar beam, and wherein an end of the first upper wall of the leading-edge part is attached to an end of the second upper wall of the trailing-edge part to form the upper joint so that the first upper wall and the second upper wall form the upper spar cap of the male spar beam.

2. The male spar beam according to claim 1, wherein the upper joint and/or the lower joint is positioned at a position in the range of 5%-95% of the width of the upper spar cap and/or the lower spar cap, respectively.

3. The male spar beam according to claim 1, further comprising an upper interior strip and/or a lower interior strip,
   wherein the upper interior strip is attached to and overlaps an interior surface of the first upper wall of the leading-edge part and an interior surface of the second upper wall of the trailing-edge part, and/or
   wherein the lower interior strip is attached to and overlaps an interior surface of the first lower wall of the leading-edge part and an interior surface of the second lower wall of the trailing-edge part.

4. The male spar beam according to claim 3, further comprising a first shear web part having a third shear wall attaching the upper interior strip to the lower interior strip, the first shear web part being manufactured separately from the leading-edge part and the trailing-edge part, and the third shear wall is formed integrally in one piece with the upper interior strip and the lower interior strip.

5. The male spar beam according to claim 1, further comprising an upper exterior strip and/or a lower exterior strip
   wherein the upper exterior strip is attached to and overlaps an exterior face of the first upper wall of the leading-edge part and an exterior face of the second upper wall of the trailing-edge part, and/or
   wherein the lower exterior strip is attached to and overlaps an exterior face of the first lower wall of the leading-edge part and an exterior face of the second lower wall of the trailing-edge part.

6. The male spar beam according to claim 1, further comprising an engagement member protruding from the second end of the male spar beam, the engagement member being configured for being inserted into and engaging with the female receiving section of the segmented wind turbine blade.

7. The male spar beam according to claim 1, wherein the first shear wall of the leading-edge part comprises an at least partially embedded first reinforcement structure including a first receiving portion, and the second shear wall of the trailing-edge part comprises an at least partially embedded second reinforcement structure including a second receiving portion aligned with the first receiving portion, wherein the first reinforcement structure and/or the second reinforcement structure comprise a metal, and
   the first receiving portion and/or the second receiving portion form part of a locking arrangement of the segmented wind turbine blade and are configured for receiving an engagement element of the locking arrangement, thereby mutually locking the segmented wind turbine blade.

8. The male spar beam according to claim 1, wherein the first upper wall and the first lower wall of the leading-edge part and the second upper wall and the second lower wall of the trailing-edge part have a positive draft angle to ease removal from the first female mould and the second female mould, respectively.

9. A segmented wind turbine blade having a profiled contour including a pressure side and a suction side, and a leading edge and a trailing edge with a chord extending therebetween, the segmented wind turbine blade extending in a longitudinal direction between a root end and a tip end, the segmented wind turbine blade comprising a first blade segment having a female receiving section, and a second blade segment having the male spar beam according to claim 1 configured for insertion into and engaging with the female receiving section of the first blade segment.

10. The segmented wind turbine blade according to claim 9, wherein the female receiving section defines an inner cavity and has a longitudinal inner end and an opposite longitudinal open end at an end face of the first blade segment, wherein the second blade segment is connected to the first blade segment at a chord-wise joint,
   the male spar beam protruding at the chord-wise joint from an end face of the second blade segment and extending through the longitudinal open end of and into the cavity of the female receiving section to be received therein, thereby attaching the first blade segment to the second blade segment, the segmented wind turbine blade additionally comprising a locking arrangement mutually locking the female receiving section and the male spar beam and thereby the first and second blade segment.

11. A method of manufacturing a male spar beam for a segmented wind turbine blade, the segmented wind turbine blade having a profiled contour including a pressure side and a suction side, and a leading edge and a trailing edge with a chordwise direction extending therebetween, the segmented wind turbine blade extending in a longitudinal direction from a root end to a tip end thereof, the method comprising the steps of:
   providing a pre-cured trailing-edge part comprising a first upper wall, a first lower wall, and a first shear wall connecting the first upper wall with the first lower wall;
   providing a pre-cured leading-edge part comprising a second shear wall, a second upper wall and a second lower wall, wherein the pre-cured leading-edge part is provided separately from the pre-cured trailing-edge part; and
   forming the male spar beam by attaching the first upper wall of the pre-cured leading-edge part to the second upper wall of the pre-cured trailing-edge part via an upper joint to form an upper spar cap of the male spar beam, and attaching the first lower wall of the pre-cured leading-edge part to the second lower wall of the pre-cured trailing-edge part via a lower joint to form a lower spar cap of the male spar beam, wherein the male spar beam extends in the longitudinal direction extending from a first end to a second end thereof, the second end being configured for engaging with a female receiving section of the segmented wind turbine blade,
   wherein the upper spar cap extends in the longitudinal direction, the upper spar cap having a width bounded by a left upper boundary and a right upper boundary, the upper spar cap having an upper joint arranged between the left upper boundary and the right upper boundary, and the upper spar cap being configured for facing one of the pressure side and the suction side of the segmented wind turbine blade,
   wherein the lower spar cap extends in the longitudinal direction, the lower spar cap having a width bounded by a left lower boundary and a right lower boundary, the lower spar cap having a lower joint arranged between the left lower boundary and the right lower boundary, the lower spar cap being configured for facing the other one of the pressure side and the suction side of the segmented wind turbine blade, and the lower spar cap being positioned opposite of and extending in parallel to the upper spar cap,
   wherein the pre-cured leading-edge part is formed integrally in one piece in a first female mould (100) and comprises a fibre-reinforced laminate material, wherein the pre-cured trailing-edge part is formed integrally in one piece in a second female mould (100) separately from the pre-cured leading-edge part and comprises a fibre-reinforced laminate material, wherein an end of the second lower wall of the pre-cured leading-edge part is attached to an end of the first lower wall of the pre-cured trailing-edge part to form the lower joint so that the first lower wall and the second lower wall form the lower spar cap of the male spar beam, and wherein an end of the second upper wall of the pre-cured leading-edge part is attached to an end of the first upper wall of the pre-cured trailing-edge part to form the upper joint so that the first upper wall and the second upper wall form the upper spar cap of the male spar beam.

12. The method according to claim 11, wherein the step of providing the pre-cured trailing-edge part comprises a sub-method of manufacturing the pre-cured leading-edge part including the steps of:

providing a first fibre material and one or more first elongated fibre-reinforced elements, and the first female mould having a first mould surface having a first left wall face, a first floor face, and a first right wall face arranged opposite of the first left wall face, the first wall faces extending upwards from the first floor face;

arranging the first fibre material and the one or more first elongated fibre-reinforced elements on the first mould surface of the first mould;

infusing the first fibre material, and co-infusing the one or more first elongated fibre-reinforced elements, with a first resin material; and curing the first fibre material and the one or more first elongated fibre-reinforced elements to provide the pre-cured leading-edge part in one piece; and/or wherein the step of providing a pre-cured trailing-edge part comprises a sub-method of manufacturing the pre-cured trailing-edge part including the steps of:

providing a second fibre material and one or more second elongated fibre-reinforced elements, and the second female mould having a second mould surface having a second left wall face, a second floor face, and a second right wall face arranged opposite of the second left wall face, the second wall faces extending upwards from the second floor face;

arranging the second fibre material and the one or more second elongated fibre-reinforced elements on the second mould surface of the second mould;

infusing the second fibre material and co-infusing the one or more second elongated fibre-reinforced elements with a second resin material; and curing the second fibre material and the one or more second elongated fibre-reinforced elements to provide the pre-cured trailing-edge part in one piece, wherein the first fibre material, the one or more first elongated fibre-reinforced elements, and the first mould are different from the second fibre material, the one or more second elongated fibre-reinforced elements, and the second mould, respectively.

13. The method according to claim 11, wherein the step of providing the pre-cured leading-edge part comprises arranging a first reinforcement structure in the first fibre material on the first lower face of the first mould, and wherein the step of infusing the first fibre material comprises co-infusing the first reinforcement structure, and/or wherein the step of providing the pre-cured trailing-edge part comprises arranging a second reinforcement structure in the second fibre material on the second lower face of the second mould, and wherein the step of infusing the second fibre material comprises co-infusing the second reinforcement structure, and wherein the method further comprises a step of providing a first receiving portion in the first reinforcement structure and/or a step of providing a second receiving portion in the second reinforcement structure, the second receiving portion being aligned with the first receiving portion, the first receiving section and/or the second receiving section forming part of a locking arrangement of the segmented wind turbine blade and being configured for receiving an engagement element of the locking arrangement, thereby mutually locking the segmented wind turbine blade.

14. The method according to claim 11, further comprising:

providing a first exterior strip and/or a second exterior strip, the first exterior strip and/or the second exterior strip comprising a fibre laminate, optionally being either cured or uncured, and wherein the method further comprises:

overlapping and attaching the first exterior strip to an exterior face of the first upper wall of the pre-cured leading-edge part and an exterior face of the second upper wall of the pre-cured trailing-edge part, and/or overlapping and attaching the second exterior strip to an exterior face of the first lower wall of the pre-cured leading-edge part and an exterior face of the second lower wall of the pre-cured trailing-edge part.

15. The method according to claim 11, further comprising:

providing an upper interior strip and/or a lower interior strip, the upper and lower interior strips comprising a cured or uncured fibre laminate, and overlapping and attaching the upper interior strip to an interior surface of the first upper wall of the pre-cured leading-edge part and an interior surface of the second upper wall of the pre-cured trailing-edge part, and/or overlapping and attaching the lower interior strip to an interior surface of the first lower wall of the pre-cured leading-edge part and an interior surface of the second lower wall of the pre-cured trailing-edge part.

16. The method according to the claim 15, wherein the step of providing the upper interior strip and the lower interior strip further comprises providing a first shear web part having a third shear wall attaching the upper interior strip to the lower interior strip, the third shear wall being formed integrally with the upper interior strip and the lower interior strip in one piece.

* * * * *